United States Patent
Bradley et al.

(10) Patent No.: US 6,460,838 B1
(45) Date of Patent: Oct. 8, 2002

(54) FIBER REINFORCED SUSPENSION MEMBER

(75) Inventors: Douglas James Bradley, Howell, MI (US); Robert Christian Lawson, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/832,027

(22) Filed: Apr. 10, 2001

(51) Int. Cl.[7] .............................. F16F 1/36; F16F 1/18
(52) U.S. Cl. .................................. 267/149; 267/47
(58) Field of Search ......................... 267/47, 147, 148, 267/149

(56) References Cited

U.S. PATENT DOCUMENTS

| | | | |
|---|---|---|---|
| 4,530,490 A | * 7/1985 | Misumi et al. | 267/47 |
| 4,556,204 A | 12/1985 | Pflederer | |
| 4,565,356 A | 1/1986 | Nickel | |
| 4,659,071 A | * 4/1987 | Woltron | 267/149 |
| 4,696,459 A | * 9/1987 | Woltron et al. | 267/149 |
| 4,707,317 A | * 11/1987 | Epel et al. | 267/47 |
| 4,969,633 A | * 11/1990 | Ryan | 267/148 |

FOREIGN PATENT DOCUMENTS

| | | | | |
|---|---|---|---|---|
| JP | 58118338 | * | 7/1983 | 267/47 |
| JP | 04362328 | * | 12/1992 | 267/47 |

* cited by examiner

Primary Examiner—Christopher P. Schwartz
(74) Attorney, Agent, or Firm—Brinks Hofer Gilson & Lione

(57) ABSTRACT

The present invention provides for a fiber reinforced suspension member having an integral pivot opening. The suspension member includes a first portion, a second portion and a central portion disposed in between the first portion and the second portion. The suspension member in accordance with the teachings of the present invention is formed of fibers that extend longitudinally from the first portion to the central portion and curve around the central portion such that an opening is defined in the central portion. The fibers forming the suspension member typically comprise an upper fiber layer and a lower fiber layer. The upper fiber layer and the lower fiber layer interface in the first portion and the second portion and are separated in the central portion. The upper layer fiber and the lower layer fiber are reinforced around the opening by stitching reinforcing fibers through the thickness of the suspension member.

13 Claims, 3 Drawing Sheets

FIBER REINFORCED SUSPENSION MEMBER

TECHNICAL FIELD OF THE INVENTION

This patent discloses and claims a useful, novel, and unobvious invention for a fiber reinforced suspension system for use in motor vehicles. More specifically a fiber reinforced suspension member with an integral pivot opening is disclosed in the present application.

BACKGROUND OF THE INVENTION

Suspension members in motor vehicles are typically fabricated from steel layers. This method of fabricating suspension members is not only cumbersome but also increases the overall weight of the motor vehicle. Recently, in order to manufacture lighter vehicles composite materials such as fiberglass or carbon fibers have been used to make suspension members. Although these composite materials have good physical properties they tend to be more expensive than a traditional metal part. Much of the cost of the suspension member parts is attributed to the fact that pivots or mounting holes usually take the form of separate metal pieces that have to be bolted, riveted or bonded to the composite material. Therefore, there is a need in the automotive industry to make suspension members that are light and cheaper.

DETAILED DESCRIPTION OF THE PREFERRED EMBODIMENTS

Figure 1:
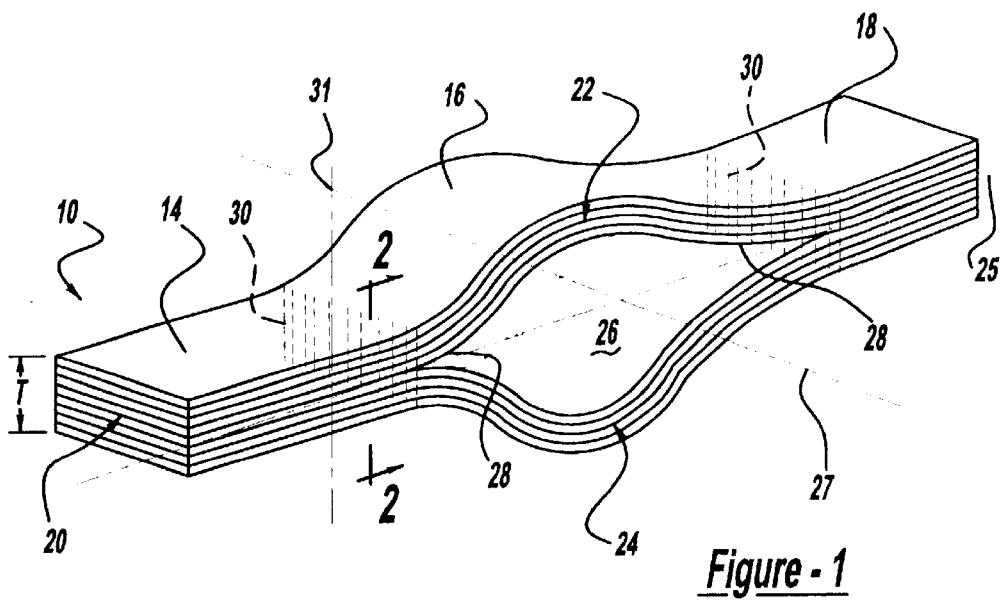
FIG. 1 is a perspective view of the fiber reinforced suspension member, the opening having a circular cross-section and having the reinforcement fibers displaced along the transverse axis in accordance with the preferred embodiment of the present invention.

The following description of the preferred embodiment is merely exemplary in nature, and is in no way intended to limit the invention or its application or uses.

Referring in particular to the drawings, a composite suspension member having an integral pivot point in accordance with the teachings of the present invention is generally designated by reference numeral 10. Although not shown in the drawings, a suspension member 10 is preferably used to connect the vehicular frame to components of a vehicle that are in contact with the ground such as wheels.

As shown in FIG. 1, the suspension member 10 in accordance with the teachings of the present invention comprises a first portion 14, a central portion 16 and a second portion 18. Preferably, the central portion 16 is disposed in between the first portion 14 and the second portion 18. Alternatively it is possible that the central portion 16 is disposed at one end of the first portion 14 or the second portion 18. The suspension member 10 defines a longitudinal axis 25 and a transverse axis 27.

Figure 4:
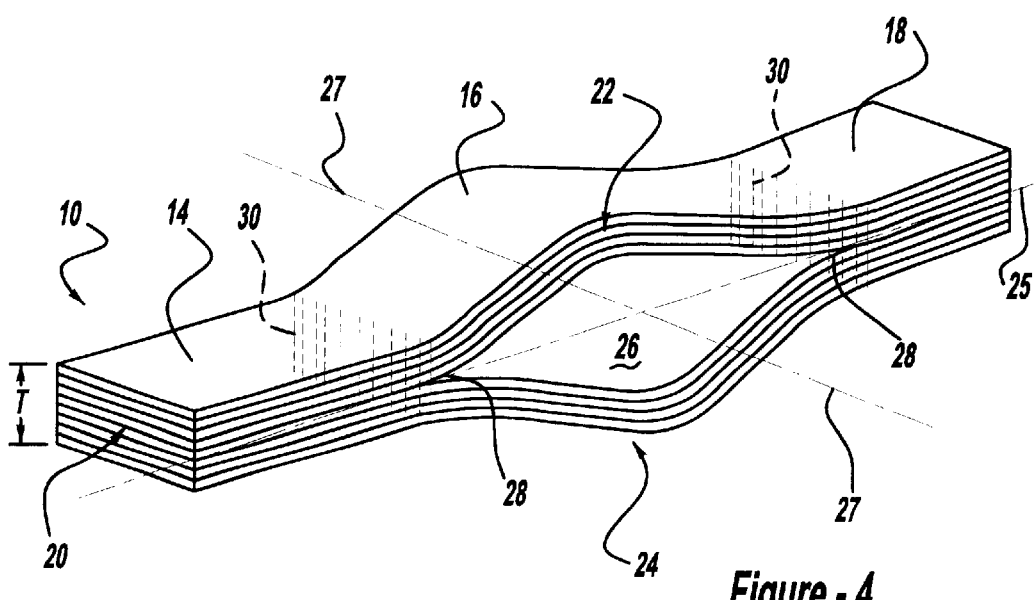
FIG. 4 is a perspective view of the fiber reinforced suspension member the opening having a diamond shaped cross-section and having the reinforcement fibers displaced along the transverse axis in accordance with the second embodiment of the present invention.

As shown in FIG. 1, the central portion 16 has a substantially circular cross section and functions to receive a connector or a pivot member that connects the suspension member 10 to other components of a motor vehicle. Preferably, the central portion 16 is symmetrical about the longitudinal axis 25 and the transverse axis 27. Alternatively, it is possible that the central portion 16 has an oblong configuration or a diamond shape cross-section (as shown in FIG. 4). Further, the central portion 16 may take any alternate shape capable of defining an opening. The first portion 14 and the second portion 18 preferably extend longitudinally away from the central portion 16. Preferably, the first portion 14 and the second portion 18 are beam shaped and are substantially parallel to the longitudinal axis 25 of the suspension member 10. Alternatively, it is possible to have the first portion 14 and the second portion 18 curved around the central portion 16 such that they oscillate around the longitudinal axis 25. Alternatively, the first portion 14 and the second portion 18 may have a trapezoid hexagonal cross-section.

Figure 2:
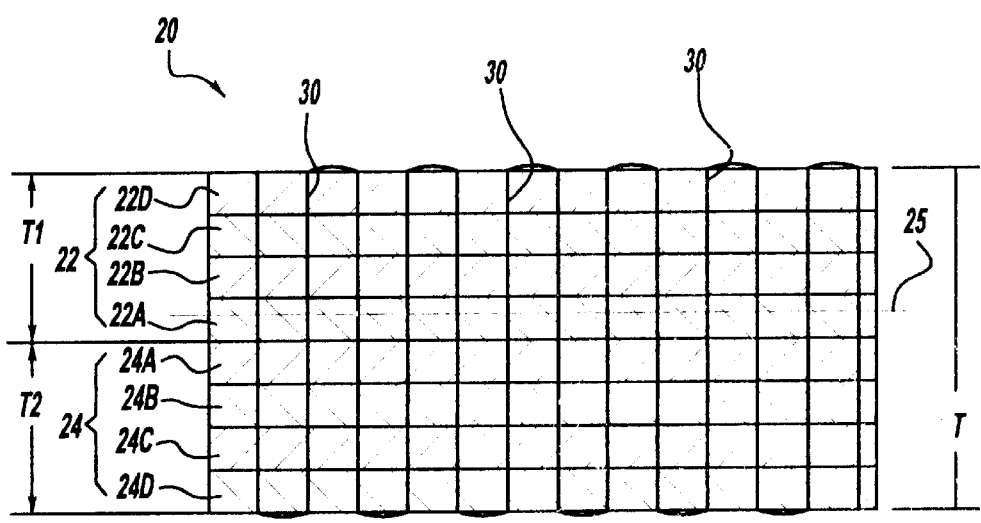
FIG. 2 is a cross-sectional view along line 2—2 in FIG. 1 in accordance with the preferred embodiment of the present invention.

As shown in FIG. 1, the suspension member 10 is formed of substantially contiguous layers of fibers generally represented by reference numeral 20. In order to obtain the suspension member 10 of the desired thickness multiple layers of the fiber 20 are superimposed on each other as shown in FIG. 2. Although in the drawings only eight layers of fibers are shown to be superimposed on each other it is possible to have less that eight layers of fiber or more than eight layers of fiber. The thickness of the suspension member 10 is generally represented as T. Preferably, the fibers 20 used to form the suspension member 10 are dry unidirectional fibers such as synthetic fibers, metal fibers, animal fibers or vegetable fibers. Alternatively, it is also possible to use pre-impregnated fibers where the fibers have been pre treated with a resin. The liquid resin typically used is conventional and can take the form of a polyester, vinyl ester, epoxy, phenolic, cyanate ester and/or any other resin.

As shown in FIGS. 1 and 2, the multiple layers of fibers 20 that form the suspension member 10 typically comprise an upper fiber layer 22A, 22B, 22C and 22D, jointly represented as upper fiber layers 22 and a lower fiber layer 24A, 24B, 24C and 22D jointly represented as lower fiber layers 24. The upper fiber layer 22A, 22B, 22C and 22D are superimposed on each other to obtain the desired thickness generally represented by T1. Like the upper fiber layer 22, the lower fiber layers 24A, 24B, 24C and 24D, are superimposed on each other to obtain the desired thickness T2. The total thickness T of the suspension member 10 is the total of the thickness T1 of the upper fiber layers 22 and the thickness T2 of the lower fiber layers 24. Although in the drawings only four upper fiber layers 22 and lower fiber layers 24 are shown, it must be understood that more than four layers of fibers may be used to define the thickness T of the suspension member 10. Alternatively, it is possible that the upper fiber layer 22 includes more fiber layer than of lower fiber layers 24, or visa versa.

As shown in the FIG. 1, the upper fiber layers 22 extend horizontally from the first portion 14, to the second portion 18 by curving around the central portion 16. Alternatively it is possible that some of the upper fiber layers 22 do not curve around the central portion 16 such that they are straight extend only in the first portion 14 or the second portion 18 without curving around the central portion 16. Similarly, the lower fiber layer 24 extends form the first portion 14 to the second portion 18 by curving around the central portion 16. Alternatively, it is possible that some of the lower layer of fibers extend only in the first portion 14 or the second portion 18. These fibers do not generally curve around the central portion 16.

As shown in FIG. 1, in order to obtain the suspension member 10 of the present invention the upper fiber layers 22 and the lower fiber layers 24 run substantially parallel to each other. Typically the upper fiber layer 22A and the lower fiber layer 24A interface along the longitudinal axis 25 of the suspension member 10 at the first portion 14 and the second portion 18. At the central portion 16, the upper fiber layer 22A and the lower fiber layer 24A split such that the upper fiber layer 22A curves above the longitudinal axis 25 and the lower fiber layer 24A curves below the longitudinal axis 25 of the suspension member 10. As shown in FIG. 1, at the first portion 14 and the second portion 18, the upper fiber layer 22A and the lower fiber layer 24A are integrally joined to form a beam like structure. At the central portion 16, the upper fiber layer 22A and the lower fiber layer 24A are split to define an opening 26.

Figure 3:
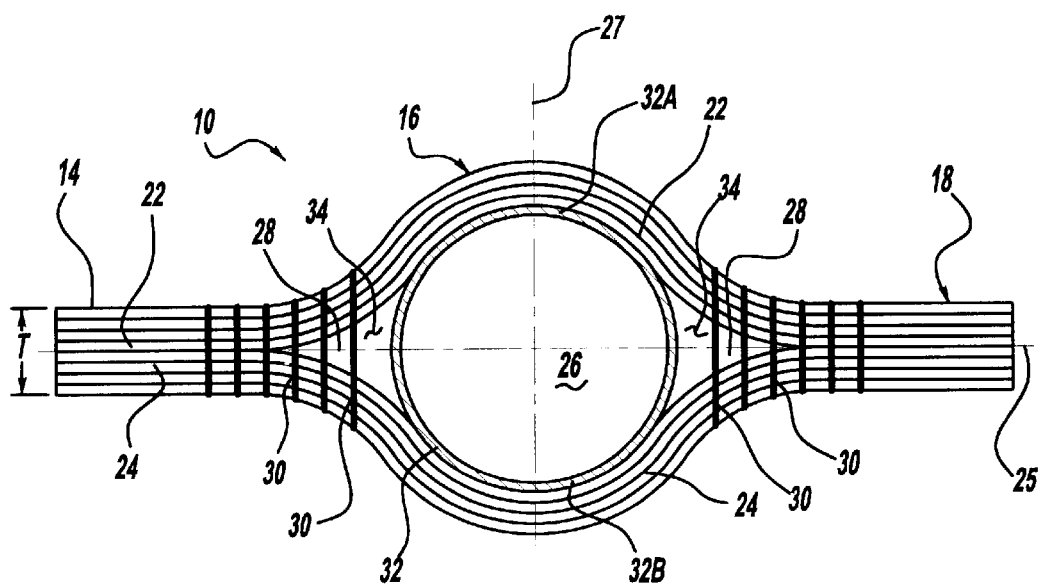
FIG. 3 is a front view of the fiber reinforced suspension member having an integral bushing and the reinforcement fibers displaced along the longitudinal axis in accordance with the preferred embodiment of the present invention.

Alternatively, it is also possible to form the suspension member 10 where a bushing or a pin 32 (as shown in FIG. 3) is molded in the central portion 16. Therefore, in such instance the bushing 32 will define the opening 26. In the case where a bushing 32 is used to define the opening 26, the upper fiber layers 22 extend from the first portion 14 and curve around the upper part 32A of the bushing 32 to the second portion 18 of the suspension member 10. Similarly, the lower fiber layers 24 extend from the first portion 14 and curve around the lower part 32B of the bushing 32 to the second portion 18 of the suspension member 10. Preferably, the bushing 32 is removable after the tooling process. Alternatively, it is possible that the bushing 32 is not removed after the tooling process and is an integral part of the suspension member 10 (as shown in FIG. 3).

After the multiple layers of fibers 20 are superimposed on each other to form the first portion 14, the central portion 16 and the second portion 18, the structure is molded to form the suspension member 10 (as shown in FIG. 2) where the resin is cured using techniques that are conventional in the art. Preferably, during the molding operation, the upper fiber layer 22A and the lower fiber layer 24A are integrally connected along the longitudinal axis 25 in the first portion 14 and the second portion 18 of the suspension member 10.

As discussed above, the suspension member 10 is typically subject to high loads and stress. Since the upper fiber layer 22A and the lower fiber layer 24A are split in the area 28 of the opening 26, the opening 26 creates a high stress concentration in area 28. Therefore, when the suspension member 10 is subject to high load and stresses, the upper fiber strand 22A and the lower fiber strand 24A have a tendency to separate along the longitudinal axis 25. In order to prevent separation of the upper fiber layer 22A and the lower fiber layer 24A, the area 28 is reinforced by a reinforcing fiber 30, as shown in FIG. 2. Preferably the reinforcing fiber used is fiberglass. Alternatively, aramid fibers or organic fibers such as those commercially available from E. I. du Pont de Nemours & Co under the trademark KEVLAR® may be used as reinforcing fiber 30. It is also possible to use carbon fibers as a reinforcing fiber. Preferably, the reinforcing fiber 30 is stitched through the thickness T of the suspension member 10 around the areas 28 using an industrial sewing machine (not shown). Preferably, multiple stitches of the reinforcing fiber 30 are present to hold together the upper layer of fiber 22 and the lower layer of fiber 24. As shown in FIG. 2, preferably the reinforcing fiber 30 is stitched such that the reinforcing fiber 30 is substantially perpendicular to the longitudinal axis 25 of the suspension member 10. Preferably, the reinforcing fiber 30 is stitched such that the multiple stitches are displaced along the transverse axis 27 of the suspension member 10. Alternatively, the multiple stitches of the reinforcing fiber 30 may be stitched such that they are longitudinally displaced along the longitudinal axis 25 of the suspension member 10 (as shown in FIG. 3). Further, reinforcing fiber 30 extends such that the upper fiber layer 22A and the lower fiber layer 24A are held together in the area 28 around the opening 26.

As shown in FIG. 3, in the suspension member 10 where a bushing 32 defines the opening 26, a gap 34 is defined in the area 28 between the sides of the bushing 32 and the first portion 14 and the second portion 18. In order to reinforce the upper fiber layer 22A and the lower fiber layer 24A, the reinforcing fibers 30 are preferably stitched using an industrial machine by the process described above. Preferably where the bushing 32 is used to define the opening 26 the reinforcing fiber 30 are displaced along the longitudinal axis 25 of the suspension member 10. Alternatively, it is possible to stitch the reinforcing fibers 30 along the longitudinal axis 25 and transverse axis 27. The above process of reinforcing the area 28 around the opening 26 is preferably performed prior to the molding process. However, it is possible to reinforce the area 28 after the suspension member 10 is molded.

As any person skilled in the art will recognize from the previous description and from the figures and claims, modifications and changes can be made to the preferred embodiments of the invention without departing from the scope of the invention.

What is claimed is:

1. A fiber reinforced suspension member to be used in a motor vehicle comprising:
    an upper layer of fiber;
    a lower layer of fiber;
    a first reinforcing fiber extending through the upper layer of fiber to the lower layer of fiber and adapted to connect the upper layer of fiber and the lower layer of fiber at a first location;
    a second reinforcing fiber extending through the upper layer of fiber to the lower layer of fiber and adapted to connect the upper layer of fiber and the lower layer of fiber in a second location, wherein the first reinforcing fiber and the second reinforcing fiber define an opening between the first location and the second location; and
    a bushing placed within the opening between the first location and the second location in fiber reinforced suspension member.

2. The fiber reinforced suspension member of claim 1 wherein the opening defines a circular cross-section.

3. The fiber reinforced suspension member of claim 1 wherein the opening defines a diamond shaped cross-section.

4. The fiber reinforced suspension member of claim 1 wherein the upper layer of fiber and the lower layer of fiber are selected from a group consisting of synthetic fibers, metal fibers, vegetable fibers and animal fibers.

5. The fiber reinforced suspension member of claim 1 wherein the upper layer of fiber and the lower layer of fiber are pre-treated with a resin wherein the resin is selected from a group consisting of polyester, vinyl ester, epoxy, phenolic, and cyanate ester.

6. The fiber reinforced suspension member of claim 1 wherein the bushing is an integral part of the fiber reinforced suspension member.

7. A fiber reinforced suspension member of claim 1 wherein the first reinforcing fiber and the second reinforcing fiber are in form of stitches such that the upper layer of fibers and the lower layer of fiber are held together by the stitches at the first location and the second location.

8. A fiber reinforced suspension member of claim 1 wherein the first reinforcing fiber and the second reinforcing fiber are substantially perpendicular to the longitudinal axis of the fiber reinforced suspension member.

9. The fiber reinforced suspension member of claim 1 wherein the first reinforcing fiber and the second reinforcing fiber are selected from a group consisting of fiber-glass, aramid fiber and carbon fibers.

10. A method of forming fiber reinforced suspension member comprising the steps of:

providing an first layer of fiber;

providing an second layer of fiber;

stitching a first reinforcing fiber through the first layer of fiber to the second layer of fiber at a first location such that first layer of fiber and second layer of fiber are connected at the first location;

stitching a second reinforcing fiber through the first layer of fiber to the second layer of fiber at a second location such that first layer of fiber and second layer of fiber are connected at the second location;

defining an opening with the first reinforcing fiber and the second reinforcing fiber between the first location and the second location; and placing a bushing within the opening between the first location and the second location.

11. The method of claim 10 further comprising selecting the first layer of fiber and the second layer of fiber are selected from a group consisting of synthetic fibers, metal fibers, vegetable fibers and animal fibers.

12. The method of claim 10 further comprising pre-treating the first layer of fiber and the second layer of fiber with a resin selected from a group consisting of polyester, vinyl ester, epoxy, phenolic, and cyanate ester.

13. The method of claim 10 further comprising selecting the first reinforcing fiber and second reinforcing fibers are selected from a group consisting of fiber-glass, aramid fiber, and carbon fibers.

* * * * *